US012739339B2

(12) United States Patent
Cui

(10) Patent No.: US 12,739,339 B2
(45) Date of Patent: Sep. 15, 2026

(54) PREVIEW IMAGE CAPTURE PROCESSING METHOD AND ELECTRONIC DEVICE

(71) Applicant: Honor Device Co., Ltd., Shenzhen (CN)

(72) Inventor: Hantao Cui, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/832,604

(22) PCT Filed: Sep. 8, 2023

(86) PCT No.: PCT/CN2023/117623

§ 371 (c)(1),
(2) Date: Jul. 24, 2024

(87) PCT Pub. No.: WO2024/082863

PCT Pub. Date: Apr. 25, 2024

(65) Prior Publication Data

US 2025/0168292 A1 May 22, 2025

(30) Foreign Application Priority Data

Oct. 21, 2022 (CN) ......................... 202211297222.5

(51) Int. Cl.
*H04N 5/262* (2006.01)
*G06T 5/70* (2024.01)
(Continued)

(52) U.S. Cl.
CPC ............. *H04N 5/2621* (2013.01); *G06T 5/70* (2024.01); *G06V 10/60* (2022.01); *H04N 23/632* (2023.01); *H04N 23/84* (2023.01)

(58) Field of Classification Search
CPC .... H04N 5/2621; H04N 23/632; H04N 23/84; H04N 23/667; H04N 5/272; H04N 5/772;
(Continued)

(56) References Cited

U.S. PATENT DOCUMENTS 12,170,835 B2 12/2024 Wang et al.
2006/0140278 A1* 6/2006 Gomila ................. H04N 19/14 382/254

(Continued)

FOREIGN PATENT DOCUMENTS

CN 103218778 A 7/2013
CN 106657810 A 5/2017

(Continued)

OTHER PUBLICATIONS

S. Xue,et al., "Learning and Applying Color Styles From Feature Films," Computer Graphics Forum, vol. 32, No. 7, Nov. 25, 2013 (Nov. 25, 2013), pp. 255-264.

*Primary Examiner* — Chiawei Chen
(74) *Attorney, Agent, or Firm* — Conley Rose, P.C.

(57) ABSTRACT

An image processing method and an electronic device. The method includes obtaining one or more film materials, where the one or more film materials include a first film material. When the electronic device receives and responds to a camera activated operation, the electronic device may capture an image in real time through a camera. When the electronic device receives and responds to a selection operation for the first film material, the electronic device may process the image captured in real time based on the first film material, so that a first film display effect is presented on an image processed by the first film material. The first film display effect may include a grain effect, and/or a scratch effect, and/or a light leak effect.

16 Claims, 13 Drawing Sheets

(51) Int. Cl.
*G06V 10/60* (2022.01)
*H04N 23/63* (2023.01)
*H04N 23/84* (2023.01)

(58) Field of Classification Search
CPC .......... H04N 5/91; H04N 9/79; H04N 9/7921; H04N 23/611; H04N 23/62; H04N 23/85; H04N 23/853; G06T 5/70; G06V 10/60
See application file for complete search history.

(56) References Cited

U.S. PATENT DOCUMENTS

| | | | | |
|---|---|---|---|---|
| 2013/0250177 | A1* | 9/2013 | Iwaki | H04N 5/253 348/655 |
| 2013/0321674 | A1* | 12/2013 | Cote | H04N 25/611 382/167 |
| 2016/0267634 | A1* | 9/2016 | Nam | G06V 10/245 |
| 2017/0132459 | A1* | 5/2017 | Sunkavalli | G06V 40/162 |
| 2018/0098050 | A1* | 4/2018 | Oshrat | G01S 11/12 |
| 2018/0349008 | A1* | 12/2018 | Manzari | H04N 23/90 |
| 2020/0344411 | A1* | 10/2020 | Cragg | H04N 23/64 |
| 2021/0158534 | A1* | 5/2021 | Kakinuma | G06V 10/28 |
| 2021/0318798 | A1 | 10/2021 | Manzari et al. | |
| 2024/0143147 | A1* | 5/2024 | Clarke | G06F 3/04883 |
| 2025/0080862 | A1* | 3/2025 | Xiao | H04N 23/84 |

FOREIGN PATENT DOCUMENTS

| | | | |
|---|---|---|---|
| CN | 108476306 | A | 8/2018 |
| CN | 109951736 | A | 6/2019 |
| CN | 110163810 | A | 8/2019 |
| CN | 113727017 | A | 11/2021 |
| CN | 113766120 | A | 12/2021 |
| CN | 113810602 | A | 12/2021 |
| CN | 113824914 | A | 12/2021 |
| CN | 113923391 | A | 1/2022 |
| CN | 114979459 | A | 8/2022 |
| EP | 4171014 | A1 | 4/2023 |
| WO | 2020102978 | A1 | 5/2020 |
| WO | 2022127787 | A1 | 6/2022 |

* cited by examiner

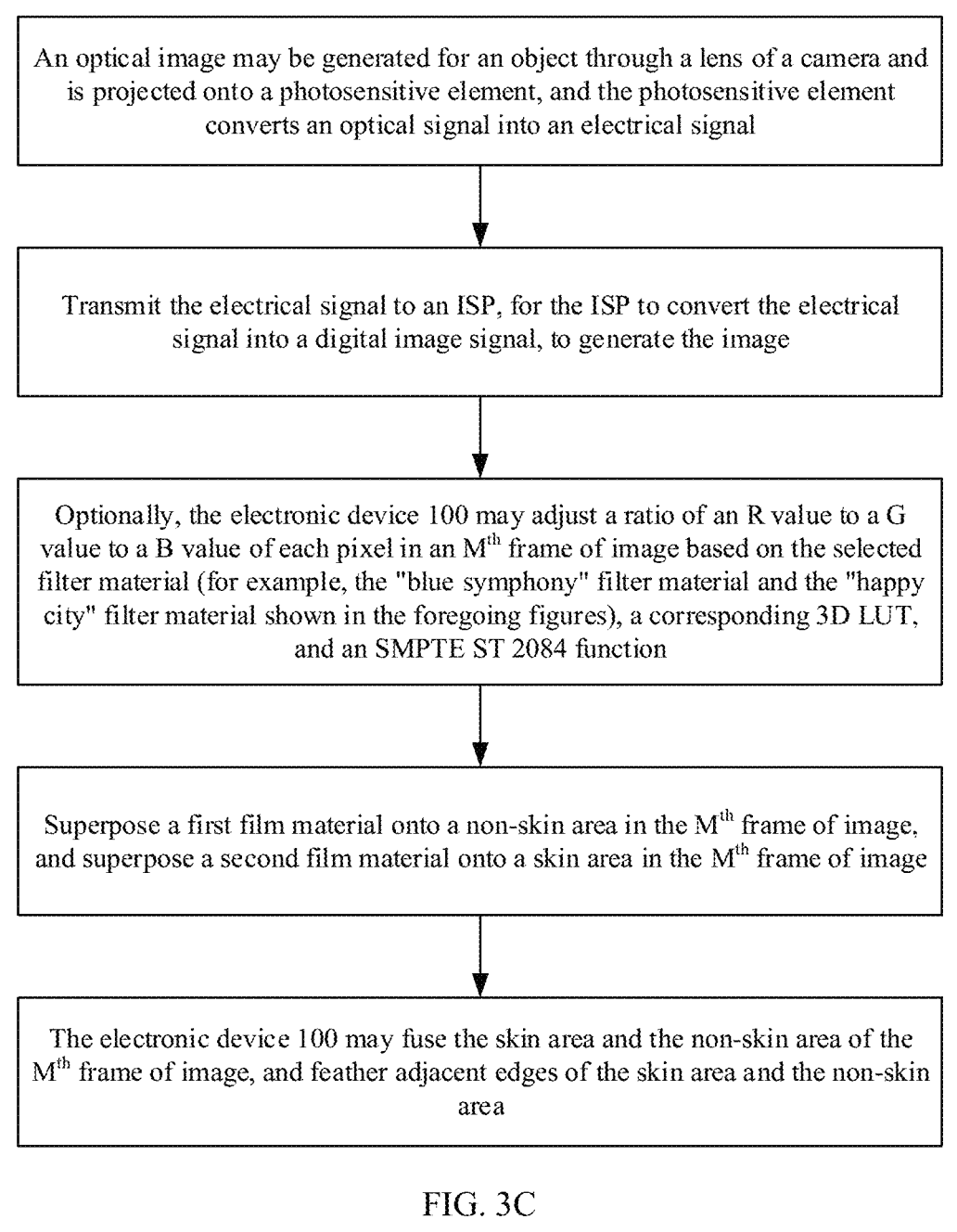

An optical image may be generated for an object through a lens of a camera and is projected onto a photosensitive element, and the photosensitive element converts an optical signal into an electrical signal Transmit the electrical signal to an ISP, for the ISP to convert the electrical signal into a digital image signal, to generate the image Optionally, the electronic device 100 may adjust a ratio of an R value to a G value to a B value of each pixel in an $M^{th}$ frame of image based on the selected filter material (for example, the "blue symphony" filter material and the "happy city" filter material shown in the foregoing figures), a corresponding 3D LUT, and an SMPTE ST 2084 function Superpose a first film material onto a non-skin area in the $M^{th}$ frame of image, and superpose a second film material onto a skin area in the $M^{th}$ frame of image The electronic device 100 may fuse the skin area and the non-skin area of the $M^{th}$ frame of image, and feather adjacent edges of the skin area and the non-skin area

FIG. 3C

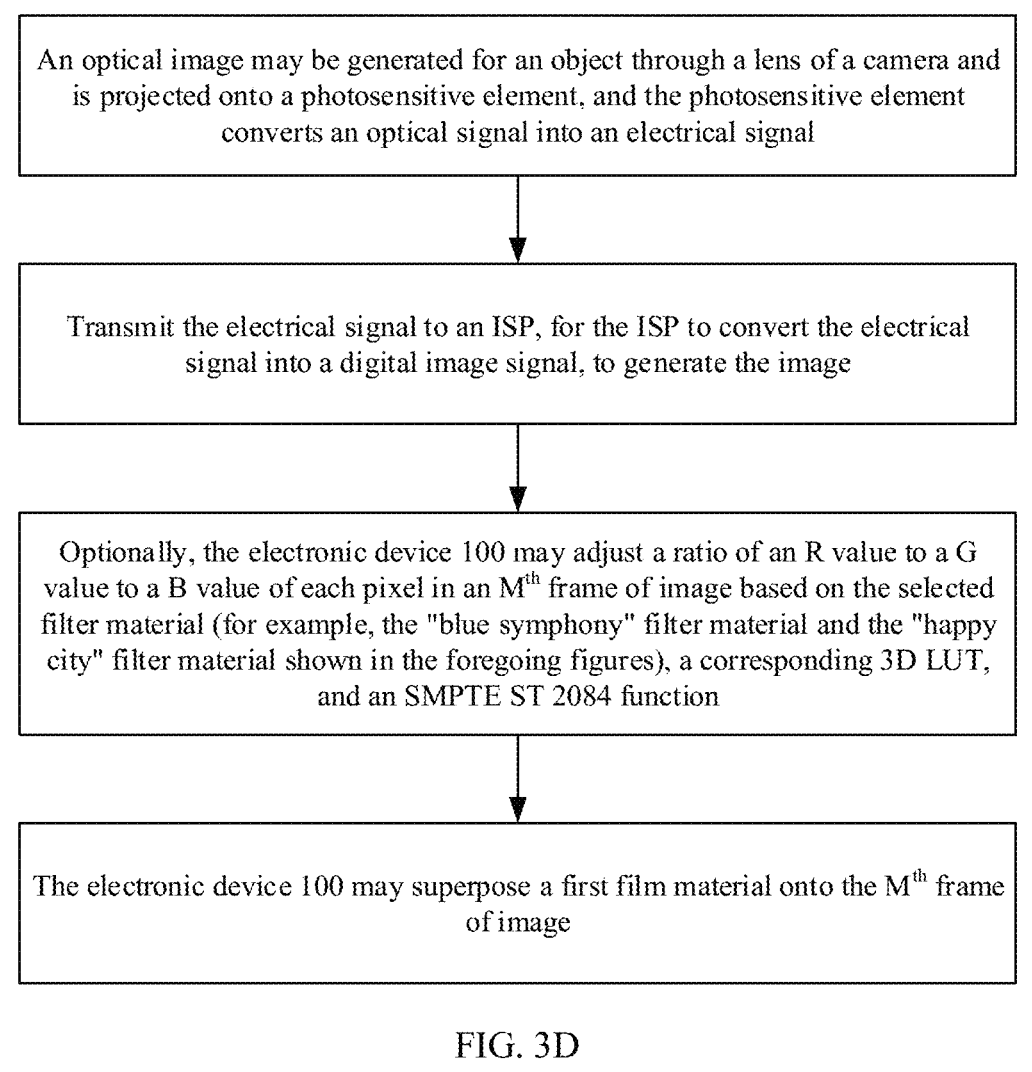

An optical image may be generated for an object through a lens of a camera and is projected onto a photosensitive element, and the photosensitive element converts an optical signal into an electrical signal

↓

Transmit the electrical signal to an ISP, for the ISP to convert the electrical signal into a digital image signal, to generate the image

↓

Optionally, the electronic device 100 may adjust a ratio of an R value to a G value to a B value of each pixel in an $M^{th}$ frame of image based on the selected filter material (for example, the "blue symphony" filter material and the "happy city" filter material shown in the foregoing figures), a corresponding 3D LUT, and an SMPTE ST 2084 function

↓

The electronic device 100 may superpose a first film material onto the $M^{th}$ frame of image

FIG. 3D

PREVIEW IMAGE CAPTURE PROCESSING METHOD AND ELECTRONIC DEVICE

CROSS-REFERENCE TO RELATED APPLICATIONS

This is a national stage of International Application No. PCT/CN2023/117623, filed on Sep. 8, 2023, which claims priority to Chinese Patent Application No. 202211297222.5, filed on Oct. 21, 2022, both of which are incorporated herein by reference in their entireties.

TECHNICAL FIELD

This application relates to the field of terminals, and in particular, to an image processing method and an electronic device.

BACKGROUND

With the development of terminal technologies, it has become a trend that a user daily uses an electronic device for making, producing, and sharing videos. The user may make the videos by using the electronic device, or may download the videos from a network to the electronic device. In daily life, for an entertainment reason, in a process that the electronic device records the videos, after capturing an image through a camera, the electronic device may further need to process the image, so that a more interesting and richer visual effect is presented on a processed image. However, currently, a visual grain effect cannot be presented on the image after the electronic device processes the image that is captured during video recording.

SUMMARY

This application provides an image processing method and an electronic device. After the electronic device processes an image captured in real time based on a selected film material, a corresponding film display effect may be presented on the image, so that a richer and more interesting visual effect may be presented on the image.

According to a first aspect, this application provides an image processing method, applied to an electronic device, and including: The electronic device obtains one or more film materials, where the one or more film materials includes a first film material, and the one or more film materials are configured to process an image captured in real time through a camera on the electronic device, so that a corresponding film display effect is presented on a processed image. The electronic device captures, in response to a camera activated operation, the image in real time through the camera, and displays a photographing interface, where the photographing interface includes a preview window. The electronic device processes, in response to a selection operation for the first film material and based on the first film material, the image captured in real time, to generate a preview stream. The electronic device displays screen content of the preview stream in the preview window; where a first film display effect is presented on the screen content of the preview stream. In this way, after the electronic device processes, based on the first film material, the image captured in real time, a richer and more interesting visual effect may be presented on the screen content of the preview stream.

In a possible implementation, that the electronic device processes, in response to a selection operation for the first film material and based on the first film material, the image captured in real time, to generate a preview stream specifically includes: The electronic device determines, in response to the selection operation for the first film material, whether the image captured in real time includes a portrait. When the electronic device determines that the image captured in real time includes a portrait, the electronic device demarcates a skin area and a non-skin area of the image captured in real time. The electronic device processes the non-skin area based on the first film material, and processes the skin area based on a second film material generated from the first film material. The electronic device generates a preview stream based on the image captured in real time and processed by the first film material and the second film material. In this way; the electronic device may perform processing based on the skin area and the non-skin area of the image and different film materials respectively, so that a processing effect of the image may be finer.

In a possible implementation, that the electronic device processes the non-skin area based on the first film material, and processes the skin area based on a second film material generated from the first film material specifically includes: The electronic device denoises and softens the first film material, to generate the second film material. The electronic device processes the non-skin area based on the first film material, and processes the skin area based on the second film material. In this way, the skin area processed based on the second film material is more delicate than the non-skin area processed based on the first film material.

In a possible implementation, when the electronic device determines that the image captured in real time does not include the portrait, the electronic device processes, based on the first film material, the image captured in real time. In this way, image processing efficiency may be improved.

In a possible implementation, a second film display effect is further presented on the screen content of the preview stream.

In a possible implementation, the one or more film materials are film materials obtained after developing and scanning a 18% grey card photographed based on one or more films having different light sensitivity; an average value of brightness of each film material of the one or more film materials is a first average value, duration of each film material is 15 seconds, and each second includes 30 frames of film images. In this way; image processing efficiency may be increased by using an obtained film material, and storage space of the electronic device may be saved.

In a possible implementation, the first film material includes a first pixel, the image captured in real time includes a second pixel, and the first pixel corresponds to the second pixel That the electronic device processes, in response to a selection operation for the first film material and based on the first film material, the image captured in real time, to generate a preview stream specifically includes: The electronic device processes, in response to the selection operation for the first film material and based on a superposition formula and the first film material, the image captured in real time, where when a brightness value of the first pixel is less than or equal to the first average value, the superposition formula is a new RGB value of the second pixel=the brightness value of the first pixel×an original RGB value of the second pixel÷the first average value; or when a brightness value of the first pixel of the first film material is greater than the first average value, the superposition formula is a new RGB value of the second pixel=1−(1−an original RGB value of the second pixel)×(1−the brightness value of the first pixel)÷the first average value. The electronic device generates the preview stream based on the image captured in real time and processed by the first film material. In this way, when a brightness value of a pixel on the film material is large, a bright area of the image processed based on the pixel may be slightly affected, and a dark area of the image processed based on the pixel may be greatly affected. When a brightness value of a pixel on the film material is small, a bright area of the image processed based on the pixel may be greatly affected, and a dark area of the image processed based on the pixel may be slightly affected.

In a possible implementation, the first average value is 0.5.

In a possible implementation, before that the electronic device processes, in response to a selection operation for the first film material and based on the first film material, the image captured in real time, to generate a preview stream, the method further includes: The electronic device receives a selection operation for a first filter material, where the first filter material corresponds to a first LUT. That the electronic device processes, in response to a selection operation for the first film material and based on the first film material, the image captured in real time, to generate a preview stream specifically includes: The electronic device maps, in response to the selection operation for the first film material and based on the first LUT, an RGB value of a pixel of the image captured in real time to a new RGB value. The electronic device processes, based on the first film material, the image captured in real time and processed by the first LUT, to generate the preview stream. In this way; a visual effect presented after the image is processed may be richer.

In a possible implementation, the first LUT is a 2D LUT or a 3D LUT.

In a possible implementation, the first film display effect includes one or more of the following: a grain effect, a scratch effect, and a light leak effect.

In a possible implementation, the photographing interface further includes a first option of the first film material. That the electronic device processes, in response to a selection operation for the first film material and based on the first film material, the image captured in real time, to generate a preview stream specifically includes: The electronic device receives a touch operation acting on the first option. The electronic device processes, in response to the touch operation and based on the first film material, the image captured in real time, to generate the preview stream.

According to a second aspect, an embodiment of this application provides an electronic device, including one or more processors, one or more memories, one or more cameras, and a display. The one or more memories are coupled to the one or more processors, the one or more memories are configured to store computer program code, and the computer program code includes computer instructions. When the one or more processors execute the computer instructions, the electronic device is enabled to perform the method according to any one of the possible implementations of the first aspect. In this way, after the electronic device processes an image captured in real time based on a selected film material, a corresponding film display effect may be presented on the image, so that a richer and more interesting visual effect may be presented on the image.

According to a third aspect, an embodiment of this application provides a computer-readable storage medium, including computer instructions. When the computer instructions are run on an electronic device, the electronic device is enabled to perform the method according to any one of the possible implementations of the first aspect. In this way, after the electronic device processes an image captured in real time based on a selected film material, a corresponding film display effect may be presented on the image, so that a richer and more interesting visual effect may be presented on the image.

According to a fourth aspect, an embodiment of this application provides a chip or a chip system, including a processing circuit and an interface circuit, where the interface circuit is configured to receive code instructions and transmit the code instructions to the processing circuit, and the processing circuit is configured to execute the code instructions to perform the method according to any one of the possible implementations of the first aspect. In this way, after the processing circuit processes an image captured in real time based on a selected film material, a corresponding film display effect may be presented on the image, so that a richer and more interesting visual effect may be presented on the image.

According to a fifth aspect, an embodiment of this application provides a computer program product. When the computer program product is run on an electronic device, the electronic device is enabled to perform the method according to any one of the possible implementations of the first aspect. In this way, after the electronic device processes an image captured in real time based on a selected film material, a corresponding film display effect may be presented on the image, so that a richer and more interesting visual effect may be presented on the image.

BRIEF DESCRIPTION OF DRAWINGS

FIG. 3C is a schematic flowchart of image processing according to an embodiment of this application;

FIG. 3D is another schematic flowchart of image processing according to another an embodiment of this application.

DESCRIPTION OF EMBODIMENTS

Terms used in the following embodiments of this application are only intended to describe particular embodiments, and are not intended to limit this application. As used in the specification of this application and the appended claims, the singular expression "a", "an", "the", "the foregoing", "such a", or "this" is intended to also include a plural expression unless otherwise clearly indicated in the context. It should be further understood that the term "and/or" used in this application refers to any or all possible combinations of one or more listed items. In embodiments of this application, the terms "first" and "second" are merely intended for a purpose of description, and shall not be understood as an indication or implication of relative importance or an implicit indication of a quantity of indicated technical features. Therefore, a feature defined to be "first" or "second" may explicitly or implicitly include one or more features. In the description of embodiments of this application, unless otherwise stated, "A plurality of" refers to two or more.

First, an electronic device 100 provided in an embodiment of this application is described.

Figure 1A:
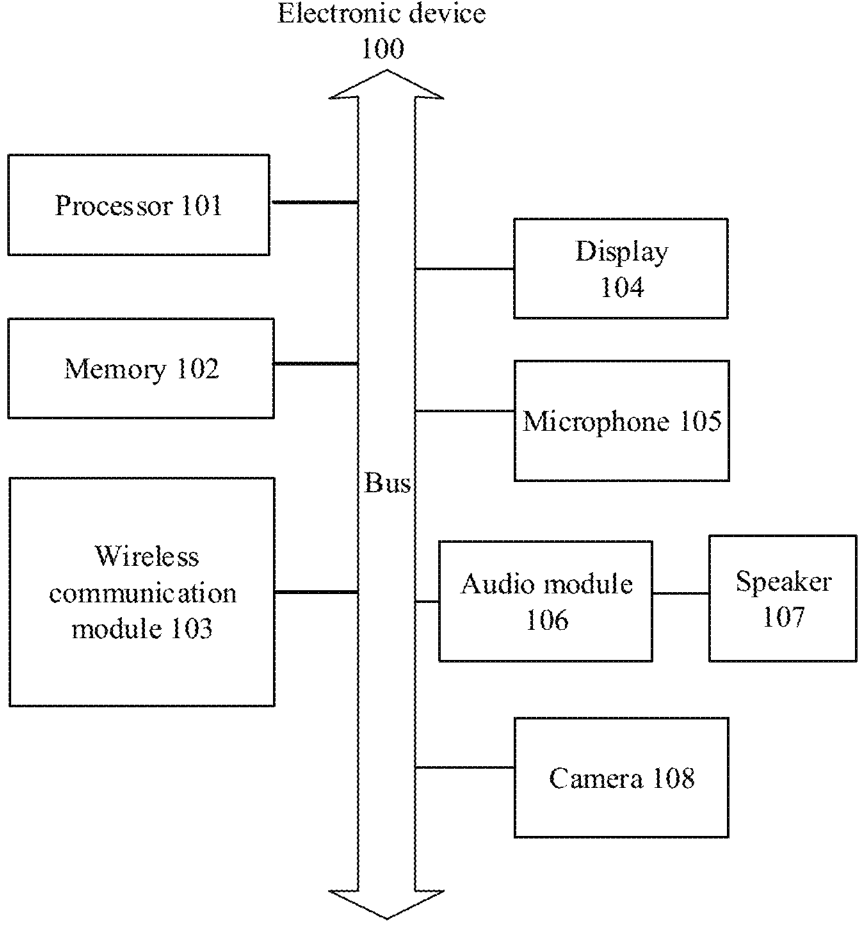
FIG. 1A is a schematic diagram of a hardware structure of an electronic device 100 according to an embodiment of this application.

FIG. 1A shows an example of a schematic diagram of a hardware structure of an electronic device 100 according to an embodiment of this application.

The electronic device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality; VR) device, an artificial intelligence (artificial intelligence, AI) device, a wearable device, an in-vehicle device, or a smart home device and/or a smart city device. A specific type of the electronic device 100 is not specifically limited in this embodiment of this application.

As shown in FIG. 1A, the electronic device 100 may include a processor 101, a memory 102, a wireless communication module 103, a display 104, a microphone 105, an audio module 106, a speaker 107, and a camera 108.

The processor 101 may include one or more processing units. For example, the processor 101 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. The controller may generate an operation control signal based on an instruction operation code and a timing signal, and implement control on instruction fetching and instruction execution.

A memory may be further disposed in the processor 101 and is configured to store instructions and data. In some embodiments, the memory of the processor 101 is a cache memory. The memory can store instructions or data just used or used cyclically by the processor 101. If the processor 101 needs to use the instructions or the data again, the processor may directly invoke the instructions or the data from the memory. This avoids repeated access and reduces waiting time of the processor 101, to improve efficiency of a system.

In some embodiments, the processor 101 may include one or more interfaces. The interface may be an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a USB interface, and/or the like.

Figure 1B:
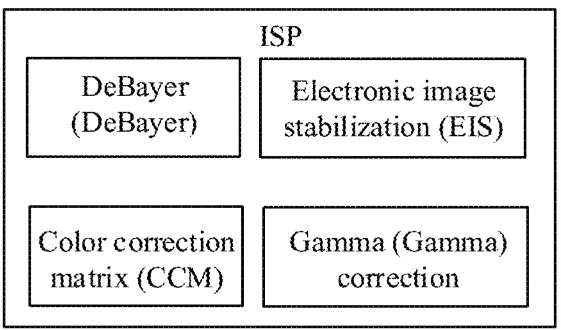
FIG. 1B is a schematic diagram of various processing algorithms for an image in an ISP according to an embodiment of this application.

In this embodiment of this application, as shown in FIG. 1B, the ISP may include various image processing algorithms, such as a DeBayer (DeBayer) algorithm, an electronic image stabilization (electronic image stabilization, EIS) algorithm, a color correction matrix (color correction matrix, CCM) algorithm, and a Gamma (Gamma) correction algorithm. The DeBayer algorithm may be used to reconstruct a full-color image from an incomplete color sample output by an image sensor covered with a color filter array. The EIS algorithm may be used to reduce vibration of the electronic device 100 to improve image clarity. The CCM algorithm may be used to correct a color error caused by color bleeding between color blocks at a filter plate. The Gamma correction algorithm may be used to edit a gamma curve of the image, detect a dark part and a light part in an image signal, and increase a ratio of the dark part to the light part, to improve an image contrast effect, and add more dark levels to perform non-linear tone editing on the image.

The memory 102 is coupled to the processor 101, and is configured to store various software programs and/or a plurality of groups of instructions. In a specific implementation, the memory 102 may include a volatile memory (volatile memory), for example, a random access memory (random access memory; RAM); or may include a non-volatile memory (non-volatile memory), for example, a ROM, a flash memory (flash memory), a hard disk drive (Hard Disk Drive, HDD), or a solid state drive (Solid State Drive, SSD). The memory 102 may alternatively include a combination of the foregoing types of memories. The memory 102 may further store some program code, so that the processor 101 can easily invoke the program code stored in the memory 102, to implement an implementation method of embodiments of this application in the electronic device 100. The memory 102 may store an operating system, for example, an embedded operating system such as uCOS, VxWorks, or RTLinux.

The wireless communication module 103 may provide a solution applied to the electronic device 100 for wireless communication such as a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology. The wireless communication module 103 may be one or more components integrating at least one communication processor module. The wireless communication module 103 receives an electromagnetic wave through an antenna, performs frequency modulation and filtering on the electromagnetic wave signal, and sends the filtered signal to the processor 101. The wireless communication module 103 may further receive a to-be-sent signal from the processor 101, perform frequency modulation and amplification on the to-be-sent signal, and convert the to-be-sent signal into an electromagnetic wave for radiation through the antenna. In some embodiments, the electronic device 100 may further detect or scan a device near the electronic device 100 by emitting a signal through a Bluetooth module (not shown in FIG. 1A) or a WLAN module (not shown in FIG. 1A) in the wireless communication module 103, and establish a wireless communication connection with and perform data transmission with the nearby device. The Bluetooth module may provide one or more Bluetooth communication solutions including classic Bluetooth (basic rate/enhanced data rate, BR/EDR) or Bluetooth low energy (Bluetooth low energy, BLE). The WLAN module may provide one or more WLAN communication solutions including Wi-Fi direct, Wi-Fi LAN, or Wi-Fi softAP.

The display 104 may be configured to display an image, a video, and the like. The display 104 may include a display panel. The display panel may be a liquid crystal display (liquid crystal display, LCD), an organic light-emitting diode (organic light-emitting diode, OLED), an active-matrix organic light-emitting diode or an active-matrix organic light emitting diode (active-matrix organic light emitting diode, AMOLED), a flexible light-emitting diode (flex light-emitting diode, FLED), a Mini-Led, a Micro-Led, a Micro-oLed, a quantum dot light emitting diode (quantum dot light emitting diodes, QLED), or the like. In some embodiments, the electronic device 100 may include 1 or N displays 104, where N is a positive integer greater than 1.

The microphone 105, which may be also referred to as "microphone" or "microphone", may be used to capture a sound signal in a surrounding environment of the electronic device, convert the sound signal into an electrical signal, and then preform a series of processing such as analog-to-digital conversion on the electrical signal to obtain an audio signal in a digital form that can be processed by the processor 101 of the electronic device. When making a call or sending voice information, a user can make a sound near the microphone 105 through the mouth of the user to input a sound signal to the microphone 105. At least one microphone 105 may be arranged in the electronic device 100. In some other embodiments, two microphones 105 may be arranged in the electronic device 100, to capture the sound signal and implement a noise reduction function. In some other embodiments, three, four, or more microphones 105 may be alternatively disposed in the electronic device 100, to capture a sound signal, implement noise reduction, recognize a sound source, implement a directional recording function, and the like.

The audio module 106 may be configured to convert digital audio information into an analog audio signal for output, and may also be configured to convert an analog audio input into a digital audio signal. The audio module 106 may be further configured to encode and decode the audio signal. In some embodiments, the audio module 106 may further be disposed in the processor 101, or some functional modules of the audio module 106 are disposed in the processor 101.

The speaker 107 may also be referred to as a "speaker", and is configured to convert an audio electrical signal into a sound signal. The electronic device 100 may listen to music or answer a hands-free call through the speaker 107.

The camera 108 is configured to capture a static image or a video. An optical image is generated for an object through a lens and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal, and then transmits the electrical signal to an image signal processor (image signal processor, ISP), for the ISP to convert the electrical signal into a digital image signal. The ISP outputs the digital image signal to a digital signal processor (digital signal processor, DSP) for processing. The DSP converts the digital image signal into a standard image signal in a format such as RGB or YUV. In some embodiments, the electronic device 100 may include 1 or N camera 108, where N is a positive integer greater than 1.

The electronic device 100 may further include a sensor module (not shown in FIG. 1A) and/or a touch sensor (not shown in FIG. 1A). The touch sensor may also be referred to as a "touch component". The touch sensor may be disposed on the display 104, and the touch sensor and the display 104 constitute a touchscreen, also referred to as a "touch control screen". The touch sensor may be configured to detect a touch operation acting on or near the touch sensor. Optionally, the sensor module may further include a gyroscope sensor (not shown in FIG. 1A), an acceleration sensor (not shown in FIG. 1A), and the like. The gyroscope sensor may be configured to determine a motion posture of the electronic device 100. In some embodiments, the electronic device 100 may determine an angular velocity of the electronic device 100 around three axes (namely, x, y, and z axes) through the gyroscope sensor. The acceleration sensor may be configured to detect accelerations of the electronic device 100 in various directions (generally x, y, and z axes), and may detect a magnitude and a direction of gravity when the electronic device 100 is still.

The electronic device 100 may further include a mobile communication module (not shown in FIG. 1A). The mobile communication module may provide a solution applied to the electronic device 100 for wireless communication such as 2G/3G/4G/5G.

It may be understood that the structure shown in this embodiment of this application constitutes no specific limitation on the electronic device 100. In some other embodiments of this application, the electronic device 100 may further include more or fewer components than those shown in the figure, some components may be combined, some components may be split, or components are arranged in different manners. The components shown in the figure may be implemented by hardware, software, or a combination of software and hardware.

Embodiments of this application provide an image processing method applied to the electronic device 100.

Specifically, in the image processing method, the electronic device 100 may obtain one or more film materials, where the one or more film materials may include a first film material. The one or more film materials may be configured to process an image captured in real time by the electronic device 100, so that a corresponding film display effect may be presented on a processed image. For example, a first film display effect may be presented on an image processed by the first film material, and a second film display effect may be presented on an image processed by a second film material. The film display effect may include a grain effect, and/or a scratch effect, and/or a light leak effect.

When the electronic device 100 receives and responds to a selection operation for the first film material, the electronic device 100 may process, based on the first film material, the image captured in real time. Specifically, the electronic device 100 may obtain the one or more film materials, where the one or more film materials includes the first film material, and the one or more film materials are configured to process the image captured in real time through a camera on the electronic device 100, so that a corresponding film display effect is presented on a processed image. The electronic device 100 may capture, in response to a camera activated operation, the image in real time through the camera, and display a photographing interface, where the photographing interface includes a preview window. Then, the electronic device 100 may process, in response to a selection operation for the first film material and based on the first film material, the image captured in real time, to generate a preview stream. Then, the electronic device 100 may display screen content of the preview stream in the preview window, where the first film display effect may be presented on the screen content of the preview stream.

In some application scenarios, the electronic device 100 may receive and respond to the camera activated operation, and capture the image in real time through the camera on the electronic device 100. Capturing the image herein may be imaging an object captured through the activated camera. When the electronic device 100 receives and responds to the selection operation for the first film material, the electronic device 100 may process the image captured in real time. Specifically, the electronic device 100 may determine whether the image captured in real time includes a first area. If the image captured in real time includes the first area, the electronic device 100 may generate the second film material based on the first film material. Then, the electronic device 100 processes the first area of the image based on the second film material, and processes a non-first area of the image based on the first film material. In subsequent embodiments, that the first area is a skin area of a portrait is used as an example for description. It should be noted that, in an actual implementation, the first area may also be a sky area, a vegetation area, and the like in the image.

For example, that the first area is the skin area of the portrait is used as an example to describe a process of the image processing method. For description of obtaining the one or more film materials by the electronic device 100, refer to the foregoing description. Details are not described herein again. The electronic device 100 may receive and respond to the camera activated operation, and capture the image in real time through the camera on the electronic device 100. When the electronic device 100 receives and responds to the selection operation for the first film material, the electronic device 100 may process the image captured in real time. Specifically, the electronic device 100 may determine whether the image captured in real time includes a portrait. If the image captured in real time includes the portrait, the electronic device 100 determines the skin area and a non-skin area of the image. The electronic device 100 may generate the second film material based on the first film material. Then, the electronic device 100 may process the skin area of the image based on the second film material, and process the non-skin area of the image based on the first film material. If the image captured in real time does not include the portrait, the electronic device 100 may process the image based on the first film material.

It can be learned from the process of the image processing method that, the electronic device 100 processes the obtained image based on the film material, so that a richer visual effect may be presented on the image.

With reference to user interfaces shown in FIG. 2A to FIG. 2G, the following introduces an application scenario of an image processing method provided in embodiments of this application.

Figure 2A:
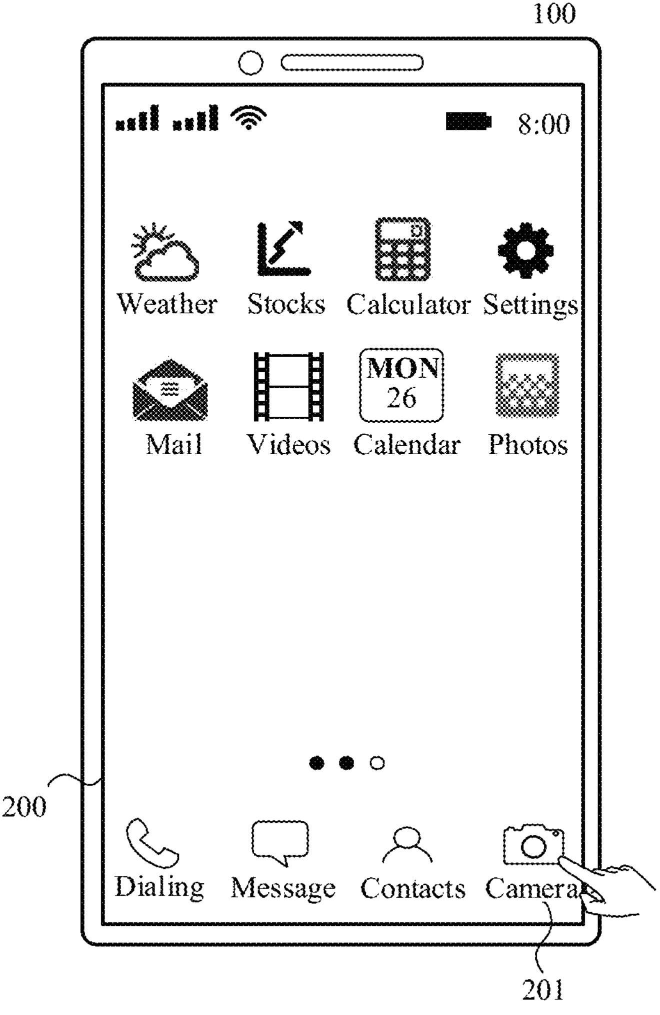
FIG. 2A to FIG. 2G are schematic diagrams of a group of user interfaces according to an embodiment of this application.

As shown in FIG. 2A, an electronic device 100 may display a desktop 200. One or more application icons may be displayed on the desktop 200. The one or more application icons may include a weather application icon, a stock application icon, a calculator application icon, a settings application icon, a mail application icon, a video application icon, a calendar application icon, a photo application icon, and the like. Optionally, a status bar, a page indicator, and a tray icon area may be further displayed on the desktop 200. The status bar may include one or more signal strength indicators of a mobile communication signal (also referred to as a honeycomb signal), a signal strength indicator of a wireless fidelity (wireless fidelity, Wi-Fi) signal, a battery status indicator, a time indicator, and the like. The page indicator may indicate a position relationship between a currently displayed page and another page. The tray icon area includes a plurality of tray icons (for example, a phone application icon, a messaging application icon, a contacts application icon, and a camera application icon 201), and the tray icons remain displayed during page switching. The page may also include a plurality of application icons and a page indicator. The page indicator may not be a part of the page, and may exist alone. The tray icon is also optional. This is not limited in this embodiment of this application.

The electronic device 100 may receive a touch operation (which may also be referred to as a camera activated operation, for example, tapping) acting on the camera application icon 201. The electronic device 100 may activate, in response to the camera activated operation, the camera to capture an image in real time, and display a photographing interface. In subsequent figures, both a photographing interface 210 and a photographing interface 220 may be referred to as the photographing interface. In some examples, in addition to the touch operation acting on the camera application icon 201, the camera activated operation may also be a voice instruction or a gesture operation, in other words, the electronic device 100 may also receive and respond to the voice instruction or the gesture operation from a user, activate the camera to capture the image in real time, and display the photographing interface.

Figure 2B:
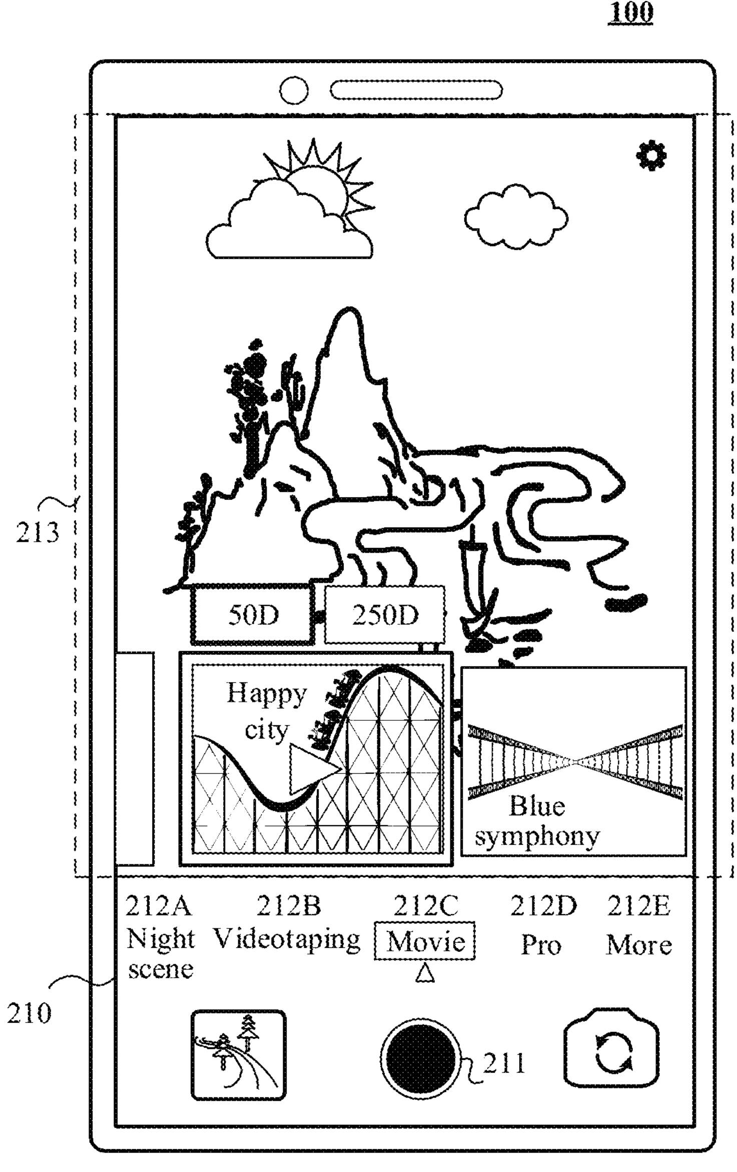
Figure 2C:
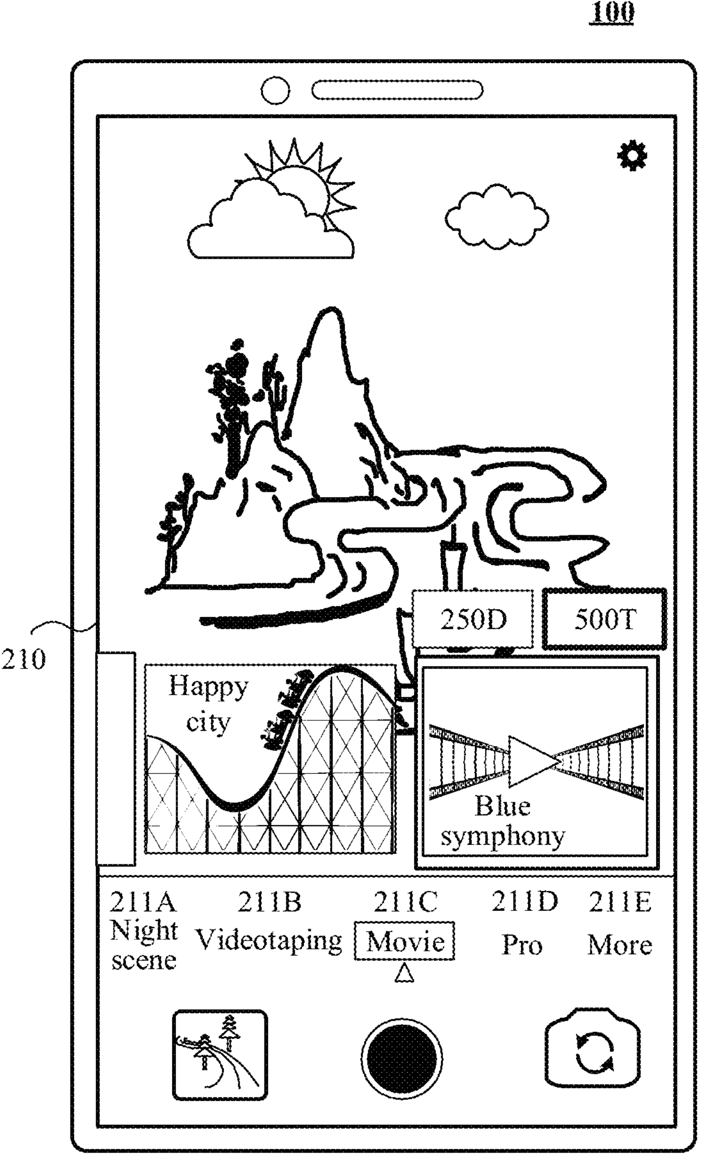

As shown in FIG. 2B, the electronic device 100 may display the photographing interface 210. The photographing interface 210 may include a photographing control 211, one or more photographing mode controls (for example, a night scene mode control 212A, a videotaping mode control 212B, a movie mode control 212C, a pro mode control 212D, and a more mode control 212E), a preview window 213, and the like. Currently, the movie mode control 212C is selected, in other words, the current photographing mode is a movie mode. In the movie mode, the electronic device 100 may display one or more filter material options (for example, a "blue symphony" option and a "happy city" option) on the photographing interface 210. Different filters may correspond to different look up tables (look up tables, LUTs). For example, a "blue symphony" filter may correspond to a LUT 1, and a "happy city" filter may correspond to a LUT 2. The LUT may be used to adjust an RGB value of the image, that is, a group of RGB values corresponding to a pixel of the image is mapped to another group of RGB values. The LUT may be divided into a 1D LUT used to adjust image brightness, a 2D LUT used to adjust image contrast, and a 3D LUT used to adjust entire color of the image. In this embodiment of this application, the 3D LUT is used as an example for description. Different filter materials may be associated with different film materials based on a photographing environment to which each filter material is applicable. For example, a filter material applicable to a photographing environment under natural light may be associated with a film material having low light sensitivity and/or a film material having medium light sensitivity. A filter material applicable to a photographing environment in a night scene environment under artificial light may be associated with a film material having medium light sensitivity and/or a film material having high light sensitivity. For example, as shown in FIG. 2B, the "happy city" filter material is applicable to the photographing environment under the natural light, and therefore may be associated with the film material having the low light sensitivity and/or the film material having the medium light sensitivity, such as 50D and 250D. As shown in FIG. 2C, the "blue symphony" filter material is applicable to the photographing environment in the night scene environment, and therefore may be associated with the film material having the medium light sensitivity and/or the film material having the high light sensitivity, such as 250D and 500T The related description of the film material is described in detail in subsequent embodiments. Details are not described herein.

Figure 2D:
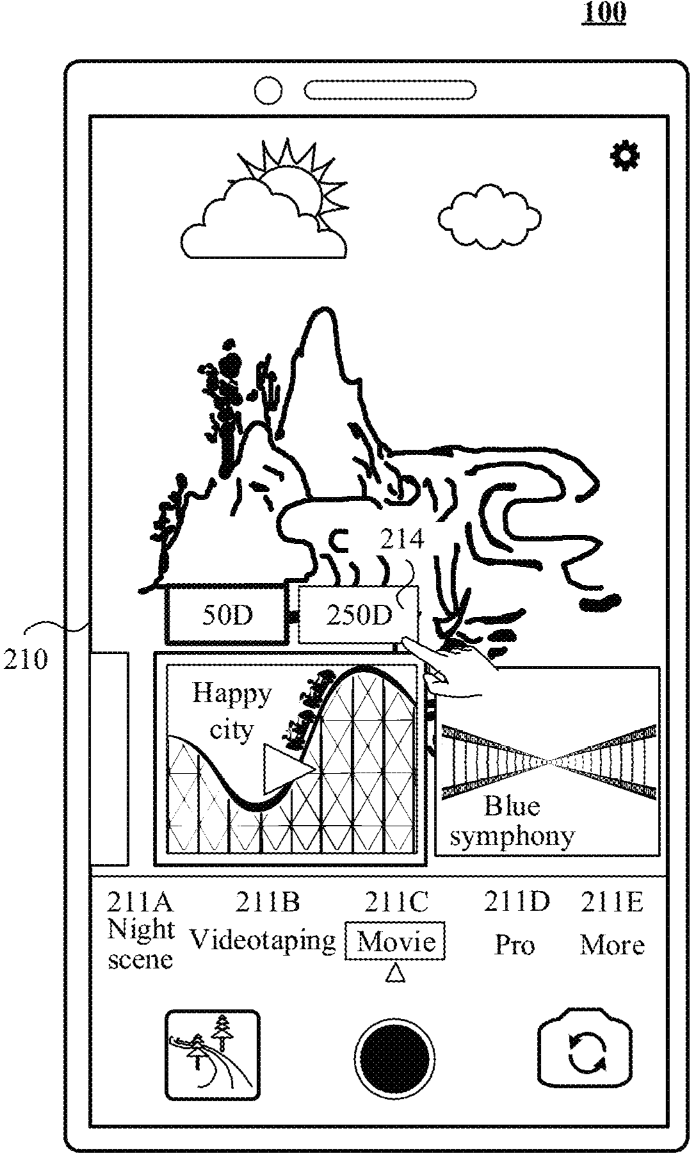

As shown in FIG. 2D, the electronic device 100 selects the "happy city." filter material for processing the image captured in real time. The electronic device 100 may receive a touch operation (for example, tapping) acting on an option 214 (which may also be referred to as a first option). The option 214 is an option corresponding to a film material with the specification 250D (which may also be referred to as a first film material) that is associated with the "happy city" filter material. The "happy city" filter material may be referred to as the first filter material, the LUT corresponding to the "happy city" filter material may be referred to as a first LUT, and the first LUT may be a 2D LUT or a 3D LUT.

Figure 2E:
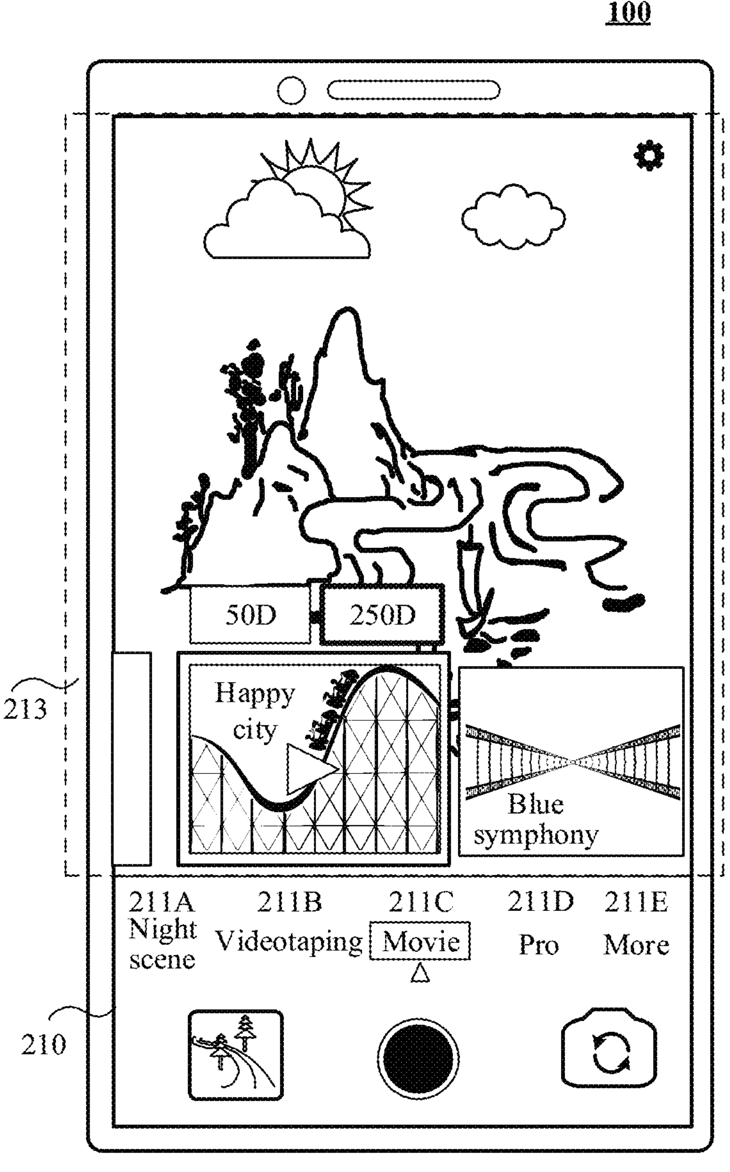

As shown in FIG. 2E, after the electronic device 100 receives the touch operation (for example, tapping) acting on the option 214 shown in the foregoing figures, the option 214 may be highlighted to indicate that the film material is selected for image processing in this case. In this case, a picture in the preview window 213 may display a film display effect corresponding to the film material, such as a grain effect, and/or a scratch effect, and/or a light leak effect.

It should be noted that, the film material (for example, the first film material) may not be associated with the filter material. Therefore, the option corresponding to the film material may not be associated with the option corresponding to the filter material.

Figure 2F:
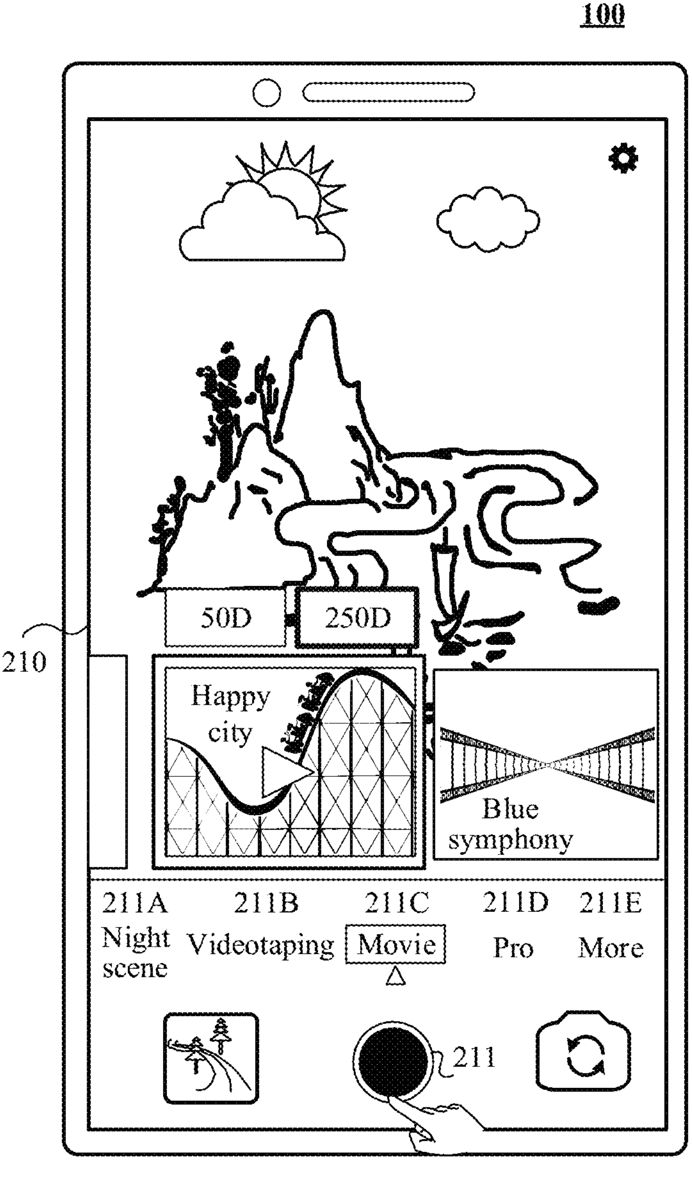

As shown in FIG. 2F, the electronic device 100 may receive a touch operation (for example, tapping) acting on the photographing control 211.

Figure 2G:
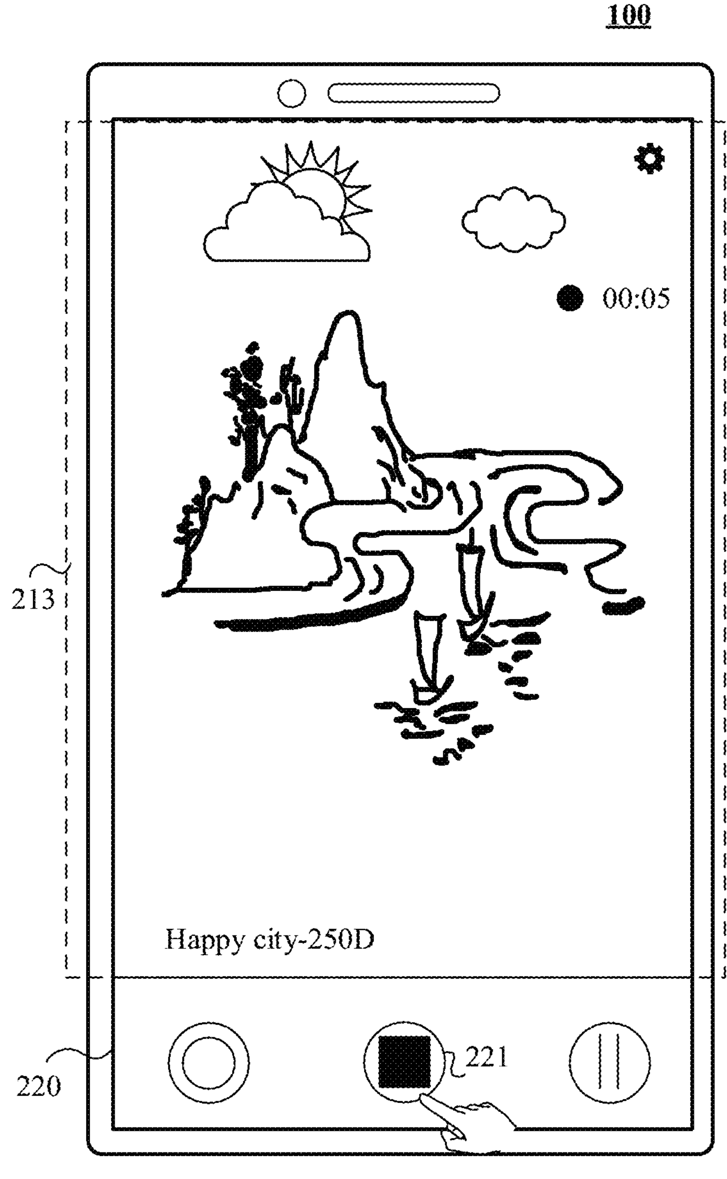

As shown in FIG. 2G, the electronic device 100 may display the photographing interface 220 in response to the touch operation (for example, tapping) acting on the photographing control 211. The photographing interface 220 may include the preview window 213 and a photographing stop control 221. The electronic device 100 may process and encode the image captured in real time based on the "happy city" filter material and the 250D film material. In this case, a prompt message, such as a text message "happy city-250D" may be displayed on the preview window 213, to prompt the user that the electronic device 100 processes the image based on the "happy city." filter material and the 250D film material. The picture in the preview window 213 may display the film display effect corresponding to the film material, such as the grain effect, and/or the scratch effect, and/or the light leak effect.

In some examples, in addition to the foregoing touch operation acting on the photographing control 211, the electronic device 100 may also receive and respond to the voice instruction or the gesture operation from the user; display the photographing interface 220; and process and encode, based on the selected film material and/or filter material, the image captured in real time.

The electronic device 100 may receive the touch operation (for example, tapping) acting on the photographing stop control 221. The electronic device 100 may stop video making in response to the touch operation, and then, obtain and save a first video file. A video picture in the first video file may display the film display effect corresponding to the first film material, such as the grain effect, and/or the scratch effect, and/or the light leak effect.

In some examples, in addition to the foregoing touch operation acting on the photographing stop control 221, the electronic device 100 may also receive and respond to a voice instruction or the gesture operation from the user, stop video making, and then, obtain and save the first video file.

It may be understood that, the foregoing user interfaces are merely used as examples to explain embodiments of this application, and do not constitute a specific limitation on this application.

A specific process of an image processing method provided in embodiments of this application is introduced below.

Figure 3A:
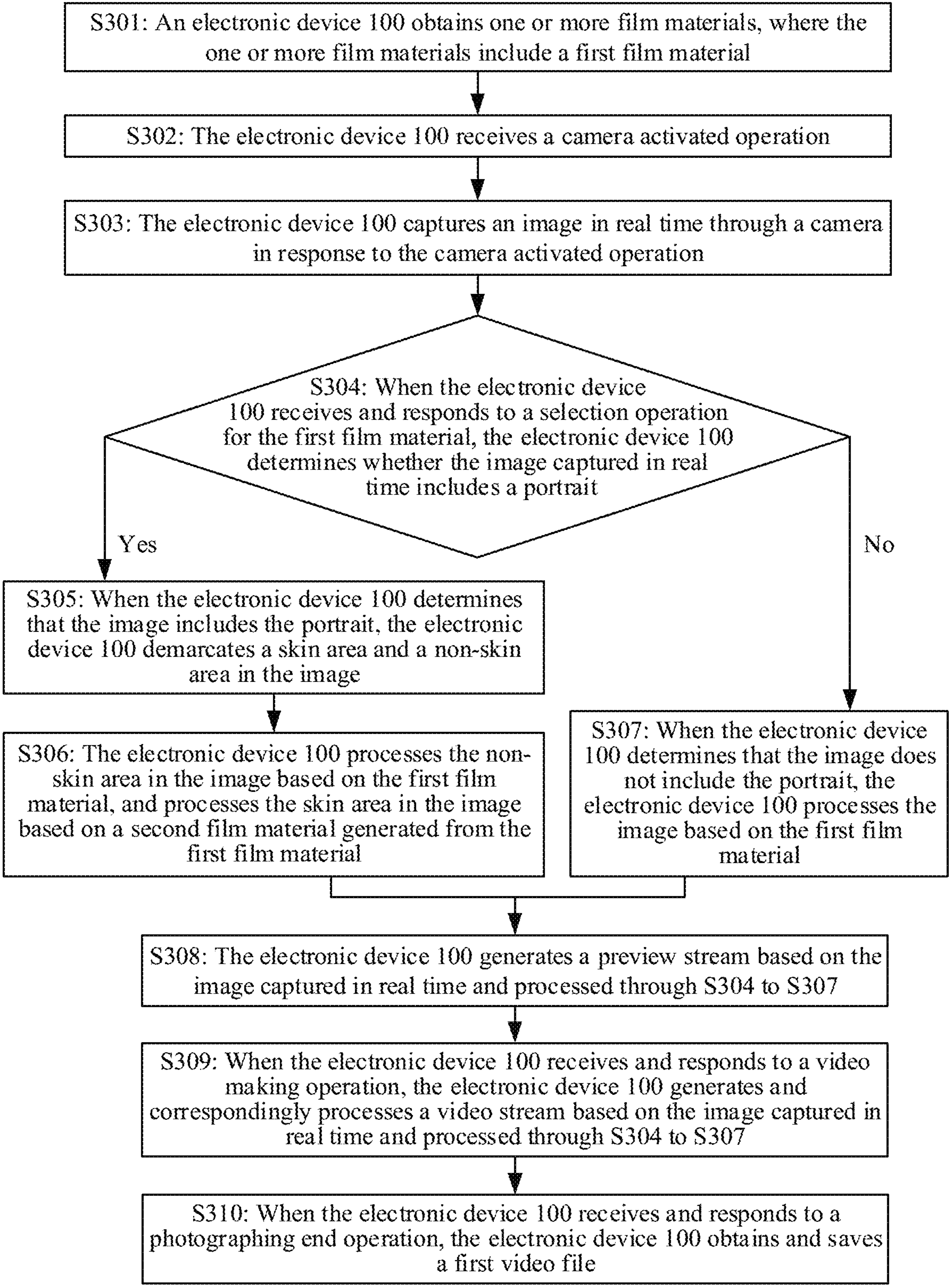
FIG. 3A is a specific schematic flowchart of an image processing method according to an embodiment of this application.

FIG. 3A shows an example of a specific schematic flowchart of an image processing method according to an embodiment of this application. As shown in FIG. 3A, a specific process of the method may include:

S301: An electronic device 100 obtains one or more film materials. The one or more film materials include a first film material.

Figure 3B:
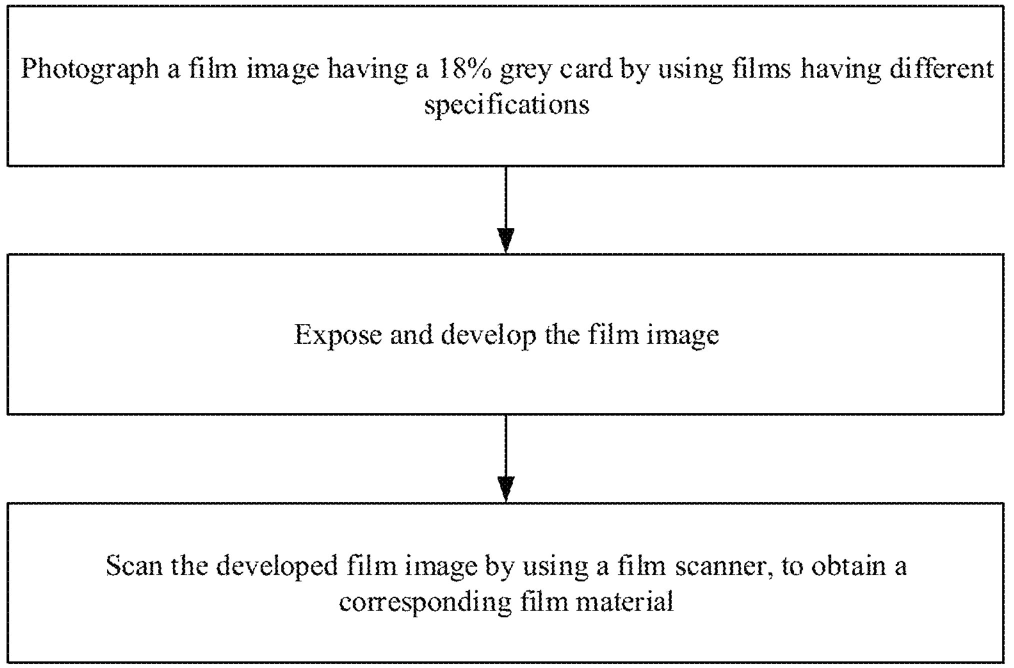
FIG. 3B is a schematic flowchart for obtaining a film material according to an embodiment of this application.

First, as shown in FIG. 3B, developers may use films having different specifications to obtain different film materials. The specification of the film may include light sensitivity of the film, a type of the film, and the like. The light sensitivity of the film may be a speed at which a photographic emulsion (for example, silver chloride, silver bromide, or silver iodide) in the film may be decomposed by light and imaged. A value of the light sensitivity of the film may be 50, 100, 150, or the like. The larger the value, the higher the light sensitivity of the film is, and the coarser a grain of the picture is when the film is imaged. In embodiments of this application, a value of the light sensitivity of the film below 100 may be referred to as low light sensitivity, a value of the light sensitivity of the film between 200 and 800 may be referred to as medium light sensitivity, and a value of the light sensitivity of the film above 800 may be referred to as high light sensitivity. In addition to the foregoing division, value thresholds of the high light sensitivity, the medium light sensitivity, and the low light sensitivity may be further divided in another manner. This is not limited in this application. The type of the film may refer to whether the film is a daylight (daylight, D) film or a tungsten (tungsten, T) film. Standard color temperature for the daylight film ranges from 5400 kelvins (kelvins, K) to 5600K, and standard color temperature for the tungsten film ranges from 3200K to 3400K. Therefore, the film may have different specifications such as 50D, 150D, 250D, or 250T. This is not limited in this application.

Specifically, in a process that developers use films having different specifications to obtain different film materials, the developers may use the films having different specifications to capture film images having a 18% grey card, and then expose and develop the film images. The developers may scan the developed film images by using a film scanner, to obtain corresponding film materials. An average value of brightness of the obtained film materials is a specified value A2 (which may also be referred to as a first average value, such as 0.5 or 0.6).

Then, the developers may obtain one or more film materials based on the processing process. In the one or more film materials, in addition to the image having the 18% grey card, imaging of a non-actual object (which may be referred to as an artifact) on the film may also be included, such as grains, scratches, and light leak on the picture when the film is imaged. Each film material may include a film image having duration of s seconds (for example, 15 seconds or 20 seconds) and t frames per second (for example, 20 frames or 30 frames). In other words, each film material includes s×t frames of film images. Preferably, the specified value A2 may be 0.5, which is beneficial to increasing computational efficiency of subsequent image processing; the duration of s seconds is 15 seconds and t frames per second are 30 frames, so that a visual effect of a plurality of processed images is natural when the images are played, repeatability of a film display effect is not easily perceived, and storage resources of the electronic device 100 may be saved.

The electronic device 100 may obtain the one or more film materials. The one or more film materials may include the first film material. The electronic device 100 may compress and store the film material by using bit depth (bit depth), for example, compress and store information about each pixel of the film material by using 32 binary bits, 16 binary bits, 8 binary bits, 4 binary bits, or 2 binary bits. Preferably, the information about each pixel of the film material may be compressed and stored by using low bit depth (for example, by using 8 binary bits, 4 binary bits, or 2 binary bits) in embodiments of this application. This may save storage space of the electronic device 100, and improve efficiency with which the electronic device 100 processes the video based on the film material subsequently.

S302: The electronic device 100 receives a camera activated operation.

For example, the camera activated operation may be the touch operation (for example, tapping) acting on the camera application icon 201 shown in FIG. 2A. In addition to the touch operation, an operation such as a voice instruction or a gesture operation that may activate a camera may also be referred to as the camera activated operation.

S303: The electronic device 100 captures an image in real time through a camera in response to the camera activated operation.

Specifically; the electronic device 100 may capture the image in real time through a front-facing camera or a rear-facing camera configured on the electronic device 100. In some examples, the electronic device 100 may obtain an image sent by another electronic device. In some other examples, the electronic device 100 may obtain an image sent by a cloud server. In other words, a manner for obtaining the image is not limited in this application. The electronic device 100 may process, based on a subsequent process and the first film material, the image obtained by the electronic device 100 from the another electronic device and/or the cloud server, so that a corresponding film display effect is presented on the image.

S304: When the electronic device 100 receives and responds to a selection operation for the first film material, the electronic device 100 determines whether the image captured in real time (the image captured in real time may also be briefly referred to as the image) includes a portrait.

For example, the selection operation for the first film material may be the touch operation (for example, tapping) acting on the option 214 shown in FIG. 2D.

Specifically; the electronic device 100 may determine whether the image captured in real time includes the portrait by using an algorithm such as a re-identification (re-identification, ReID) algorithm or an AdaBoost pedestrian detection algorithm based on dual-threshold motion area segmentation. In other words, how to determine whether the image captured in real time includes the portrait is not limited in this application.

S305: When the electronic device 100 determines that the image includes the portrait, the electronic device 100 demarcates a skin area and a non-skin area in the image.

Specifically, the electronic device 100 may demarcate the skin area and the non-skin area in the image by using an algorithm such as a skin segmentation algorithm based on generalized Gaussian distribution and a skin segmentation algorithm based on a RealAdaBoost algorithm. In other words, how to demarcate the skin area and non-skin area in the image is not limited in this application.

S306: The electronic device 100 processes the non-skin area in the image based on the first film material, and processes the skin area in the image based on a second film material generated from the first film material.

Specifically, the electronic device 100 may denoise and soften the first film material, to generate the second film material. The electronic device 100 may denoise the first film material in a manner based on a median filter method, a manner based on a gradient model algorithm, or another manner. The electronic device 100 may soften the first film material in a manner of taking an area of a specified size (3*3) centered on any pixel and using an RGB average value of a plurality of pixels in the area as an RGB value of the center pixel. In addition to the foregoing manners, the electronic device 100 may also denoise and soften the first film material by using another method.

Any frame of image captured in real time is used as an example to describe an implementation of this step.

Specifically, an optical image may be generated for an object through a lens of a camera and is projected onto a photosensitive element. The photosensitive element converts the optical signal into an electrical signal, and then transmits the electrical signal to an ISP, for the ISP to convert the electrical signal into a digital image signal, to generate the image. Then, if the electronic device 100 selects a filter material and the first film material to process the image captured in real time, the electronic device 100 processes the image based on the first film material and the second film material after processing the image based on the filter material. If the electronic device 100 does not select the filter material, the electronic device 100 directly processes the image captured in real time based on the first film material and the second film material.

For example, FIG. 3C shows an example that the electronic device 100 selects the filter material and the first film material to process the image captured in real time. As shown in FIG. 3C, an optical image may be generated for an object through a lens of a camera and is projected onto a photosensitive element. The photosensitive element converts the optical signal into the electrical signal, and then transmits the electrical signal to the ISP, for the ISP to convert the electrical signal into the digital image signal, to generate the image. Then, the electronic device 100 may map an RGB value of the pixel in the image captured in real time to a new RGB value based on the selected filter material (for example, the "blue symphony" filter material and the "happy city" filter material shown in the foregoing figures), a corresponding 3D LUT, and an SMPTE ST 2084 function; and adjust a ratio of an R value to a G value to a B value of each pixel in an $M^{th}$ frame of image. M may be used to represent any value, and the $M^{th}$ frame of image is any frame of image captured in real time.

Then, the electronic device 100 may process the $M^{th}$ frame of image based on the film material (for example, the first film material and the second film material). When a brightness value of any pixel of the film material is less than or equal to a specified value B1, the R value, the G value, and the B value may be decreased, that is, the pixel may be darkened when the ratio of the R value to the G value to the B value of the pixel in the corresponding position in the $M^{th}$ frame of image is unchanged. When the brightness value of any pixel of the film material is greater than the specified value B1, the R value, the G value, and the B value may be increased, that is, the pixel may be brightened when the ratio of the R value to the G value to the B value of the pixel in the corresponding position in the $M^{th}$ frame of image is unchanged. In this way; a grain effect, and/or a scratch effect, and/or a light leak effect corresponding to the film material may be presented on the $M^{th}$ frame of image.

The electronic device 100 may superpose the first film material onto the non-skin area in the $M^{th}$ frame of image, and superpose the second film material onto the skin area in the $M^{th}$ frame of image based on a superposition algorithm formula. In this case, in the $M^{th}$ frame of image, a first film display effect is presented on the non-skin area, and a second film display effect is presented on the skin area. For example, the superposition algorithm formula of the film material (for example, the first film material and the second film material) may be as follows:

A: When the Brightness Value of any Pixel of the Film Material is Less than or Equal to the Specified Value B1 (for Example, 0.5):

$$f(i1) = A \times B \div 0.5$$

A in the formula may represent an RGB value of a to-be-processed pixel i1 of the $M^{th}$ frame of image (in the formula, an RGB value of the pixel i1 may be normalized to range from 0 to 1), B may represent a brightness value of a pixel i2 (that is, any pixel in the condition) corresponding to the pixel i1 in the $M^{th}$ frame of film image in the film material, and f (i1) may represent an RGB value of the pixel i1 of the $M^{th}$ frame of image after the film material is superposed. 0.5 in the formula is the specified value B1. The specified value B1 may be equal to the average value of the brightness of the film material, that is the specified value A2 (that is, the first average value).

B: When the Brightness Value of any Pixel of the Film Material is Greater than the Specified Value B1 (for Example, 0.5):

$$f(i1) = 1 - (1 - A) \times (1 - B) \div 0.5$$

For descriptions of A, B, and f (i1) in the formula, refer to the foregoing descriptions. Details are not described herein again.

For example, when the electronic device 100 processes the image captured in real time based on the first film material, a processing process based on the foregoing two formulas may be as follows: The first film material includes a first pixel, the image captured in real time includes a second pixel, and the first pixel corresponds to the second pixel. When a brightness value of the first pixel is less than or equal to the first average value, the superposition formula is a new RGB value of the second pixel=the brightness value of the first pixel×an original RGB value of the second pixel÷the first average value; or when a brightness value of the first pixel of the first film material is greater than the first average value, the superposition formula is a new RGB value of the second pixel=1−(1−an original RGB value of the second pixel)×(1−the brightness value of the first pixel) ÷the first average value.

It should be noted that, the foregoing formulas are merely used as an example to describe this application, and do not constitute any limitation on this application.

It may be learned that, the image is processed based on the superposition method, so that an area having a high brightness value in the image is slightly affected by an artifact (for example, a grain and a scratch) having a high brightness value in the film material; an area having a low brightness value in the image is greatly affected by the artifact (for example, the grain and the scratch) having the high brightness value in the film material; the area having the high brightness value in the image is greatly affected by an artifact (for example, a stain) having a low brightness value in the film material; and the area having the low brightness value in the image is slightly affected by the artifact (for example, the stain) having the low brightness value in the film material.

Subsequently, the electronic device 100 may fuse the skin area and the non-skin area of the $M^{th}$ frame of image, and feather adjacent edges of the skin area and the non-skin area, so that an RGB value of a pixel of the adjacent edges of the skin area and the non-skin area may change smoothly.

S307: When the electronic device 100 determines that the image does not include the portrait, the electronic device 100 processes the image based on the first film material.

Any frame of captured image is used as an example to describe an implementation of this step.

Specifically, an optical image may be generated for an object through a lens of a camera and is projected onto a photosensitive element. The photosensitive element converts the optical signal into the electrical signal, and then transmits the electrical signal to the ISP, for the ISP to convert the electrical signal into the digital image signal, to generate the image. Then, if the electronic device 100 selects the filter material and the first film material to process the image captured in real time, the electronic device 100 processes the image based on the first film material after processing the image based on the filter material. If the electronic device 100 does not select the filter material, the electronic device 100 directly processes the image captured in real time based on the first film material.

For example, FIG. 3D shows an example that the electronic device 100 selects the filter material and the first film material to process the image captured in real time. As shown in FIG. 3D, the optical image may be generated for an object through a lens of a camera and is projected onto the photosensitive element. The photosensitive element converts the optical signal into the electrical signal, and then transmits the electrical signal to the ISP, for the ISP to convert the electrical signal into the digital image signal, to generate the image. Then, optionally the electronic device 100 may adjust the ratio of the R value to the G value to the B value of each pixel in the $M^{th}$ frame of image based on the selected filter material (for example, the "blue symphony." filter material and the "happy city" filter material shown in the foregoing figures), the corresponding 3D LUT, and the SMPTE ST 2084 function. M may be used to represent any value, and the $M^{th}$ frame of image is any frame of image captured in real time.

Then, the electronic device 100 may superpose the first film material onto the $M^{th}$ frame of image based on the superposition algorithm formula. In this case, the first film display effect is merely presented on the $M^{th}$ frame of image. For the superimposition method, refer to the description in S306. Details are not described herein again.

S308: The electronic device 100 generates a preview stream based on the image captured in real time and processed through S304 to S307.

Specifically, a plurality of frames of images captured in real time by the electronic device 100 in a chronological sequence may be referred to as an image stream. After each frame of image in the image stream is processed through S304 to S307, the preview stream may be obtained, where screen content in the preview stream may be displayed in a preview window (for example, the preview window 213) of the electronic device 100. When one or more frames of images in the image stream include the portrait, the screen content in the preview stream may include the first film display effect and the second film display effect. When the image stream does not include an image of the portrait, the first film display effect may be merely presented on the screen content in the preview stream.

S309: When the electronic device 100 receives and responds to a video making operation, the electronic device 100 generates and correspondingly processes a video stream based on the image captured in real time and processed through S304 to S307.

Specifically, when the electronic device 100 receives and responds to the video making operation, the electronic device 100 may duplicate the image stream captured in real time into two image streams, that is, an image stream 1 and an image stream 2 respectively. After each frame of image in the image stream 1 is processed through S304 to S307, a preview stream may be obtained, where screen content in the preview stream may be displayed in a preview window (for example, the preview window 213) of the electronic device 100 during video making. After each frame of image in the image stream 2 is processed through S304 to S307, a video stream may be obtained. The electronic device 100 may calculate corresponding dynamic metadata based on the video stream through SMPTE ST 2094, and then perform encoding based on the dynamic metadata and the video stream by using an encoder. In some examples, in addition to the foregoing processing method, the electronic device 100 may also process the video stream by using another method.

S310: When the electronic device 100 receives and responds to a photographing end operation, the electronic device 100 obtains and saves a first video file.

For example, the photographing end operation may be the touch operation (for example, tapping) acting on the photographing stop control 221 shown in FIG. 2F. Specifically, the electronic device 100 may obtain and save the first video file in a specified format. For example, the electronic device 100 may obtain and save the first video file in an HDR10+ format based on the encoded video stream. In a specific implementation, the electronic device 100 may also obtain and save the first video file in another format (for example, HDR10). This is not limited in this application.

It should be noted that, when a total quantity of frames of the first film material is less than a quantity of frames of images captured by the electronic device 100 through the camera, the first film material may cyclically process the image captured in real time by the electronic device 100.

For example, if the total quantity of frames of the first film material is 30, when the electronic device 100 captures the 31$^{st}$ frame of image, the electronic device 100 may process the 31$^{st}$ frame of image captured by the electronic device 100 based on the 1$^{st}$ frame of film image of the first film material; and when the electronic device 100 captures the 32$^{nd}$ frame of image, the electronic device 100 may process the 32$^{nd}$ frame of image captured by the electronic device 100 based on the 2$^{nd}$ frame of film image of the first film material. The rest can be deduced by analogy.

Then, software modules applied to an electronic device 100 according to an embodiment of this application are introduced.

Figure 4:
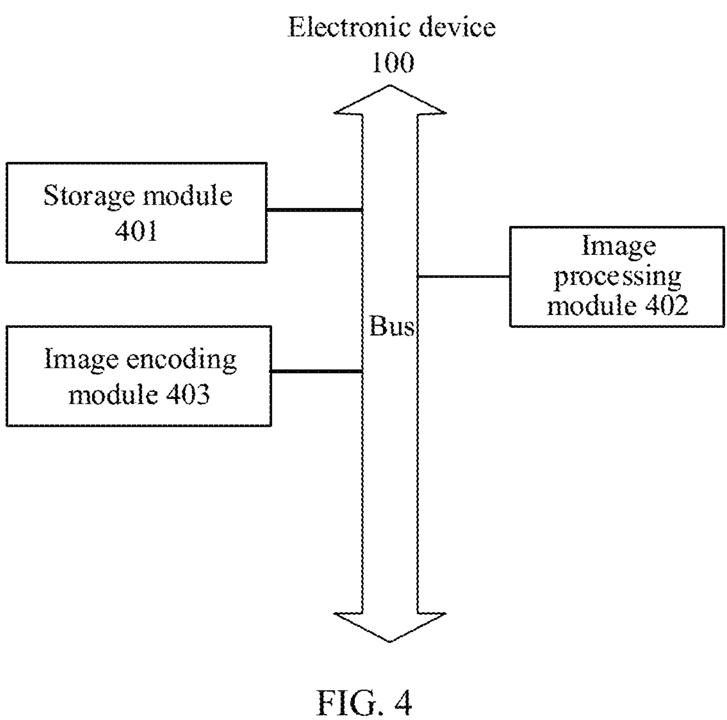
FIG. 4 is a schematic diagram of software modules applied to an electronic device 100 according to an embodiment of this application.

FIG. 4 shows an example of a schematic diagram of software modules applied to an electronic device 100 according to an embodiment of this application.

As shown in FIG. 4, the electronic device 100 may include a storage module 401, an image processing module 402, and an image encoding module 403.

The storage module 401 may be configured to store one or more film materials and a first video file, where the one or more film materials includes a first film material. The storage module 401 may further store some program code, to implement an implementation method of embodiments of this application in the electronic device 100. For a specific implementation, refer to steps shown in the foregoing flowchart. Details are not described herein again.

The image processing module 402 may be configured to process an image captured in real time by the electronic device 100 based on the first film material and/or a filter material. For a specific implementation, refer to steps shown in the foregoing flowchart. Details are not described herein again.

The image encoding module 403 may be configured to encode the image that is processed by the image processing module 402, to obtain the first video file. For a specific implementation, refer to steps shown in the foregoing flowchart. Details are not described herein again.

As used in the foregoing embodiments, based on the context, the term "when" may be interpreted as a meaning of "is", "after", "in response to determining . . . ", or "in response to detecting . . . ". Similarly, based on the context, the phrase "when determining" or "if detecting (a stated condition or event)" may be interpreted as a meaning of "if determining . . . ", "in response to determining . . . ", "when detecting (a stated condition or event)", or "in response to detecting . . . (a stated condition or event)".

All or some of the foregoing embodiments may be implemented by using software, hardware, firmware, or any combination thereof. When software is used for implementation, all or some of the embodiments may be implemented in the form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device, such as a server or a data center in which one or more usable mediums are integrated. The usable medium may be a magnetic medium (for example, a soft disk, a hard disk, or a magnetic tape), an optical medium (for example, a DVD), a semiconductor medium (for example, solid state drive), or the like.

A person of ordinary skill in the art may understand that all or some of the procedures in the methods in the embodiments may be implemented by using a computer program instructing relevant hardware. The program may be stored in a computer-readable storage medium. When the program runs, the procedures in the foregoing method embodiments may be performed. The foregoing storage medium includes:

any medium that can store program code, such as a ROM, a random access memory RAM, a magnetic disk, or an optical disc.

The invention claimed is:

1. A method, comprising:

obtaining one or more film materials, wherein the one or more film materials comprise a first film material, and the one or more film materials are configured to process an image captured in real time through a camera, to enable a corresponding film display effect to be presented on a processed image, wherein the one or more film materials are film materials obtained after developing and scanning an 18% grey card photographed based on one or more films having different light sensitivity, wherein an average value of brightness of each film material of the one or more film materials is a first average value, wherein a duration of each film material is 15 seconds, and wherein each second comprises 30 frames of film images;

denoising and softening the first film material to generate a second film material;

capturing, in response to a camera-activated operation, an image in real time through the camera, and displaying a photographing interface that comprises a preview window;

processing, in response to a selection operation for the first film material and based on the first film material, the image captured in real time, to generate a preview stream; and displaying screen content of the preview stream in the preview window, wherein a first film display effect is presented on the screen content of the preview stream.

2. The method of claim 1, wherein processing the image captured in real time to generate the preview stream comprises:

demarcating a skin area and a non-skin area of the image captured in real time when the image captured in real time comprises a portrait;

processing the non-skin area based on the first film material, and processing the skin area based on the second film material generated from the first film material; and generating the preview stream based on the image captured in real time and processed by the first film material and the second film material.

3. The method of claim 2, further comprising processing, based on the first film material, the image captured in real time when the image captured in real time does not comprise the portrait.

4. The method of claim 2, wherein a second film display effect is further presented on the screen content of the preview stream.

5. The method of claim 1, wherein the first film material comprises a first pixel, the image captured in real time comprises a second pixel, and the first pixel corresponds to the second pixel, and wherein processing the image captured in real time to generate the preview stream comprises processing, in response to the selection operation for the first film material and based on a superposition formula and the first film material, the image captured in real time, wherein when a brightness value of the first pixel is less than or equal to the first average value, the superposition formula is a new RGB value of the second pixel=the brightness value of the first pixel×an original RGB value of the second pixel÷the first average value, wherein when the brightness value of the first pixel is greater than the first average value, the superposition formula is a new RGB value of the second pixel=1−(1−an original RGB value of the second pixel)×(1−the brightness value of the first pixel)÷the first average value, and wherein the method further comprises generating the preview stream based on the image captured in real time and processed by the first film material.

6. The method of claim 5, wherein the first average value is 0.5.

7. The method of claim 1, wherein before processing the image captured in real time to generate the preview stream, the method further comprises:

receiving a selection operation for a first filter material, wherein the first filter material corresponds to a first look-up table (LUT);

mapping, in response to the selection operation for the first film material and based on the first LUT, an RGB value of a pixel of the image captured in real time to a new RGB value; and processing, based on the first film material, the image captured in real time and processed by the first LUT, to generate the preview stream.

8. The method of claim 7, wherein the first LUT is a two-dimensional (2D) LUT or a three-dimensional (3D) LUT.

9. The method of claim 1, wherein the first film display effect comprises one or more of a grain effect, a scratch effect, and a light leak effect.

10. The method of claim 1, wherein processing the image captured in real time to generate the preview stream is in response to a touch operation on a first option of the first film material in the photographing interface.

11. An electronic device, comprising:

one or more processors;

a display coupled to the one or more processors;

a camera coupled to the one or more processors; and a memory coupled to the one or more processors and configured to store instructions that, when executed by the one or more processors, cause the electronic device to be configured to:

obtain one or more film materials, wherein the one or more film materials comprise a first film material, and the one or more film materials are configured to process an image captured in real time through the camera, to enable a corresponding film display effect to be presented on a processed image, wherein the one or more film materials are film materials obtained after developing and scanning an 18% grey card photographed based on one or more films having different light sensitivity, wherein an average value of brightness of each film material of the one or more film materials is a first average value, wherein a duration of each film material is 15 seconds, and wherein each second comprises 30 frames of film images;

denoise and soften the first film material to generate a second film material;

capture, in response to a camera-activated operation, an image in real time through the camera, and displaying a photographing interface that comprises a preview window;

process, in response to a selection operation for the first film material and based on the first film material, the image captured in real time, to generate a preview stream; and display screen content of the preview stream in the preview window, wherein a first film display effect is presented on the screen content of the preview stream.

12. The electronic device of claim 11, wherein processing the image captured in real time to generate the preview stream comprises:

demarcating a skin area and a non-skin area of the image captured in real time when the image captured in real time comprises a portrait;

processing the non-skin area based on the first film material, and processing the skin area based on the second film material generated from the first film material; and generating the preview stream based on the image captured in real time and processed by the first film material and the second film material.

13. The electronic device of claim 11, wherein the first film material comprises a first pixel, the image captured in real time comprises a second pixel, and the first pixel corresponds to the second pixel, and wherein processing the image captured in real time to generate the preview stream comprises:

processing, in response to the selection operation for the first film material and based on a superposition formula and the first film material, the image captured in real time, wherein when a brightness value of the first pixel is less than or equal to the first average value, the superposition formula is a new RGB value of the second pixel=the brightness value of the first pixel×an original RGB value of the second pixel÷the first average value, wherein when the brightness value of the first pixel is greater than the first average value, the superposition formula is a new RGB value of the second pixel=1−(1−an original RGB value of the second pixel)×(1−the brightness value of the first pixel)÷the first average value, and wherein the electronic device is further configured to generate the preview stream based on the image captured in real time and processed by the first film material.

14. The electronic device of claim 11, wherein before processing the image captured in real time to generate the preview stream, the electronic device is further configured to:

receiving a selection operation for a first filter material, wherein the first filter material corresponds to a first look-up table (LUT);

mapping, in response to the selection operation for the first film material and based on the first LUT, an RGB value of a pixel of the image captured in real time to a new RGB value; and processing, based on the first film material, the image captured in real time and processed by the first LUT, to generate the preview stream.

15. The electronic device of claim 11, wherein the first film display effect comprises one or more of a grain effect, a scratch effect, and a light leak effect.

16. A non-transitory computer-readable storage medium storing instructions that, when executed by one or more processors of an electronic device, cause the electronic device to be configured to:

obtain one or more film materials, wherein the one or more film materials comprise a first film material, and the one or more film materials are configured to process an image captured in real time through a camera, to enable a corresponding film display effect to be presented on a processed image, wherein the one or more film materials are film materials obtained after developing and scanning an 18% grey card photographed based on one or more films having different light sensitivity, wherein an average value of brightness of each film material of the one or more film materials is a first average value, wherein a duration of each film material is 15 seconds, and wherein each second comprises 30 frames of film images;

denoise and soften the first film material to generate a second film material;

capture, in response to a camera-activated operation, an image in real time through the camera, and displaying a photographing interface that comprises a preview window;

process, in response to a selection operation for the first film material and based on the first film material, the image captured in real time, to generate a preview stream; and display screen content of the preview stream in the preview window, wherein a first film display effect is presented on the screen content of the preview stream.

* * * * *